United States Patent
Onomoto et al.

(10) Patent No.: US 9,523,796 B2
(45) Date of Patent: Dec. 20, 2016

(54) OPTICAL ARTICLE, MOLD USED IN PRODUCTION OF OPTICAL ARTICLE, AND MOLD PRODUCTION METHOD

(71) Applicant: Mitsubishi Rayon Co., Ltd., Tokyo (JP)

(72) Inventors: Hiroshi Onomoto, Otake (JP); Shima Nakanishi, Otake (JP); Hideki Kawachi, Otake (JP); Tetsuya Jigami, Otake (JP)

(73) Assignee: MITSUBISHI RAYON CO., LTD., Tokyo (JP)

( * ) Notice: Subject to any disclaimer, the term of this patent is extended or adjusted under 35 U.S.C. 154(b) by 28 days.

(21) Appl. No.: 14/655,502

(22) PCT Filed: Dec. 27, 2013

(86) PCT No.: PCT/JP2013/085135
§ 371 (c)(1),
(2) Date: Jun. 25, 2015

(87) PCT Pub. No.: WO2014/104308
PCT Pub. Date: Jul. 3, 2014

(65) Prior Publication Data
US 2015/0378059 A1  Dec. 31, 2015

(30) Foreign Application Priority Data
Dec. 28, 2012  (JP) .................................. 2012-287568

(51) Int. Cl.
*G02B 1/00* (2006.01)
*G02B 1/118* (2015.01)
(Continued)

(52) U.S. Cl.
CPC ................ *G02B 1/118* (2013.01); *B29C 33/42* (2013.01); *B29C 59/046* (2013.01); *G02B 1/18* (2015.01);
(Continued)

(58) Field of Classification Search
CPC ........... G02B 1/18; G02B 1/118; B82Y 10/00; B29K 2905/02; B29L 2011/00; B29C 33/424; B29C 33/42; B29C 59/046; B29C 2059/023; B29C 59/026; B29C 59/02
(Continued)

(56) References Cited

U.S. PATENT DOCUMENTS

| 7,690,910 B2 * | 4/2010 | Nakamura ............. B82Y 10/00 425/385 |
| 2007/0176320 A1 | 8/2007 | Nakamura et al. |

(Continued)

FOREIGN PATENT DOCUMENTS

| JP | H09-304295 A | 11/1997 |
| JP | 2002-303580 A | 10/2002 |

(Continued)

OTHER PUBLICATIONS

International Search Report dated Apr. 15, 2014, issued in International Application PCT/JP2013/085135.
(Continued)

*Primary Examiner* — Euncha Cherry
(74) *Attorney, Agent, or Firm* — Fitch, Even, Tabin & Flannery LLP

(57) ABSTRACT

A fine-concave-convex transfer mold with which defect regions of a molded body having a fine-concave-convex structure can be easily identified, and deformation of the fine-concave-convex structure can be inhibited even if the molded product is wound. A mold for the production of an optical article has, provided to a surface thereof, a plurality
(Continued)

of convex portions at a cycle equal to or less than the wavelengths of visible light, and a plurality of concave portions formed between the adjacent convex portions. The mold has a surface provided with a transfer area having concave portions and convex portions that have a size and shape complementing the convex portions and the concave portions of the optical article. The mold can include, in the transfer area, marking portions. The height of the convex portions in the transfer area is less than the height of convex portions in sections other than the transfer area.

13 Claims, 3 Drawing Sheets

(51) Int. Cl.
    *B29C 33/42*     (2006.01)
    *B29C 59/04*     (2006.01)
    *G02B 1/18*     (2015.01)
    *B29C 59/02*     (2006.01)
    *B29L 11/00*     (2006.01)

(52) U.S. Cl.
    CPC ...... *B29C 2059/023* (2013.01); *B29K 2905/02* (2013.01); *B29L 2011/00* (2013.01)

(58) Field of Classification Search
    USPC .......................... 359/507; 425/385; 264/219
    See application file for complete search history.

(56) References Cited

U.S. PATENT DOCUMENTS

| | | | |
|---|---|---|---|
| 2012/0325670 A1 | 12/2012 | Nakamatsu et al. | |
| 2013/0341823 A1 | 12/2013 | Nakamatsu et al. | |

FOREIGN PATENT DOCUMENTS

| | | |
|---|---|---|
| JP | 2007-230229 A | 9/2007 |
| JP | 2011-220967 A | 11/2011 |
| JP | 2011-226957 A | 11/2011 |
| JP | 2012-26863 A | 2/2012 |
| WO | 2011/111697 A1 | 9/2011 |
| WO | 2012/124498 A1 | 9/2012 |

OTHER PUBLICATIONS

Written Opinion dated Apr. 15, 2014, issued in International Application PCT/JP2013/085135.

\* cited by examiner

… (patent body)

OPTICAL ARTICLE, MOLD USED IN PRODUCTION OF OPTICAL ARTICLE, AND MOLD PRODUCTION METHOD

CROSS-REFERENCE TO RELATED APPLICATIONS

This Application is a U.S. National Stage Application filed under 35 U.S.C. §371 of International Application PCT/JP2013/085135, filed Dec. 27, 2013, designating the United States, which claims priority from Japanese Patent Application 2012-287568, filed Dec. 28, 2012, the complete disclosures of which are hereby incorporated herein by reference in their entirety for all purposes.

TECHNICAL FIELD

The present invention relates to an optical article, a mold used for manufacturing the optical article, and a method for manufacturing the mold, and particularly, to a method for manufacturing a mold for transferring a fine concave and convex, the mold therefore, and an anti-reflection film prepared by using the mold.

BACKGROUND ART

As a method of forming a fine concavo-convex structure on a surface of an optical article, a method is performed in which an elongated substrate is arranged on the circumference of a roll-shaped mold, an active energy ray-curable resin composition is filled between the roll-shaped mold and the substrate, the active energy ray-curable resin composition is cured by irradiation of the active energy ray through the substrate, and the cured resin layer and the substrate are separated from the roll-shaped mold, thereby manufacturing a molded body in a continuous manner.

The molded body thus continuously manufactured may be cut or punched into a predetermined shape according to a product specification to be used, in some cases. However, the manufactured molded body may include a defect portion not satisfying required characteristics in some cases. In order to cut or punch the molded body into a predetermined shape while avoiding such a defect portion, generally, marking is carried out on the molded body such that a defect portion can be easily identified and removed.

As a method of marking a defect portion on the molded body, a method of performing marking directly on a film or a method of performing marking by forming a mark on a mold and then transferring the mark onto the molded body is exemplified.

Patent Document 1 discloses a defect marking apparatus capable of directly marking a defect portion on a sheet-shaped product with a pen. Further, Patent Document 2 discloses a defect marking method in which a flaw for marking is made on both end of the defect portion in the width direction that is in the vicinity of the defect portion of the sheet-shaped product.

Further, a method for specifying a defect portion on a mold is performed in which, in order to specify a position on the mold corresponding to the defect portion transferred onto the molded body, a flaw is made in the vicinity of a roll-shaped mold in advance to perform marking and positions of the defect portion and the marking are compared to each other. Patent Document 3 discloses a method of performing marking on an end of a mold and then transferring the marking with a pitch corresponding to the outer circumference of the mold onto the film. Patent Documents 4 and 5 disclose a method of inspecting a manufactured plate or film.

CITATION LIST

Patent Document

Patent Document 1: JP 9-304295 A
Patent Document 2: JP 2002-303580 A
Patent Document 3: JP 2011-220967 A
Patent Document 4: JP 2011-226957 A
Patent Document 5: JP 2012-26863 A

DISCLOSURE OF THE INVENTION

Problem to be Solved by the Invention

Recently, with development of fine processing technology, it is possible to impart a nanoscale fine concavo-convex structure on the surface of the molded body. Such a nanoscale fine concavo-convex structure exerts functions derived from the structure, such as an anti-reflection function called a moth-eye effect and a water repellent function called a lotus effect, and thus industrial application of the nanoscale fine concavo-convex structure is actively made.

A molded body continuously manufactured by using the roll-shaped mold to which the nanoscale fine concavo-convex structure is imparted may be cut or punched into a predetermined shape according to a product specification to be used in some cases. For this reason, it is preferable that marking be performed on the molded body such that a defect portion can be easily identified and removed.

However, as a result of the present inventors' studies, it was found that, since the molded body having the surface on which a fine concavo-convex structure is imparted has a water repellent function called a lotus effect, this molded body may be difficult to be marked with a pen as disclosed in Patent Document 1 or the marking may easily disappear in some cases. Further, when the molded body is subjected to a chemical treatment after performing marking, the marking may blur or disappear in some cases.

Further, a defect marking method described in the above Patent Document 2 is not a marking method with an ink but a method of making a flaw on a film. According to such a method, the marking does not disappear in the post-process. However, since a considerably larger concave and convex than a nanoscale fine concavo-convex structure is formed when a flaw is made on the film, there is a problem in that the flaw may be transferred to another portion when the film is rewound in a roll shape once or the fine concavo-convex structure in a portion which is rewound on the portion with the flaw in a superimposed manner may be deformed by the flaw.

Further, in a method of making a flaw on a mold as described in Patent Document 3, it has been found that a defect such as a dent is generated at a position with which the marking portion is superimposed when the molded body is rewound in a roll shape. According to the method of making a flaw on a mold as described in Patent Document 3, a convex portion corresponding to the flaw is formed on the molded body. The convex portion thus formed is considerably larger than a nanoscale fine concavo-convex structure formed on the surface. It has been found that, when the molded body having such a convex portion is wound, the fine concavo-convex structure formed on a portion with which the convex portion is superimposed is deformed and thus a defect is further generated.

Further, from the fact that the molded body having a nanoscale fine concavo-convex structure formed on its surface is particularly excellent in anti-reflection performance and transparency, it has been found that a defect such as a dent as described above is easily identified and a yield of a product is considerably decreased.

In order to prevent such a defect from occurring, it is considered that a flaw smaller than the nanoscale fine concavo-convex structure may be made. However, it is difficult to simply create such a flaw and it is also difficult to detect the created flaw with an inspection machine.

Further, when the molded body is wounded in a roll shape and lots of layers of the molded body is superimposed on a minute flaw, in some cases, a problem may arise in which a winding wrinkle is generated and a nanoscale fine concavo-convex structure formed on a portion with the winding wrinkle is deformed.

Means for Solving Problem

The present inventors conducted intensive studies, and as a result, they found a method for easily manufacturing a mold for transferring a fine concave and convex which has been subjected to marking such that a dent is not generated even when a film is wound. Therefore, they completed the invention.

According to the invention, there is provided a mold for manufacturing an optical article which includes a plurality of convex portions having a pitch equal to or less than a wavelength of visible light and a plurality of concave portions formed between the adjacent convex portions on the surface of the optical article, the mold including a transfer region provided with concave portions and convex portions having a dimension complementary to the convex portions and the concave portions of the optical article, wherein the transfer region is provided with a marking portion and a height of the convex portion in the marking portion is lower than a height of the convex portion in other portions of the transfer region.

In the molded body manufactured by using such a mold, since the convex portions in the nanoscale concavo-convex structure have substantially the same height, it is possible to suppress generation of winding wrinkle even when the molded body is rewound in a roll shape, and it is possible to prevent the fine concavo-convex structure from being deformed. On the other hand, since the height of the concave portion in the marking portion on the molded body is higher than the height of the concave portion in a region where the other concave portions are formed (that is, the depth of the concave portion is shallower than the depth of the concave portion in the region where the other concave portions are formed), reflectance or transparency of light is changed, and thus it is possible to easily identify the marking portion.

In an aspect of the invention, the mold is characterized in that the mold is a porous alumina mold manufactured by anodizing aluminum and the marking portion is formed by bringing the porous alumina mold into contact with an etching solution capable of dissolving the mold.

In the aspect of the invention, the mold is characterized in that the marking portion has a surface shape including at least one of a letter, a geometric configuration, a geometric pattern, and an identification symbol. In addition, in the aspect of the invention, the mold is characterized in that the outer shape is a roll shape.

Further, according to the invention, there is provided an optical article including a plurality of convex portions having a pitch equal to or less than a wavelength of visible light and a plurality of concave portions formed between the adjacent convex portions on the surface of the optical article, and a marking portion, in which a height of the concave portion is higher than a height of the concave portion in a region where the other concave portions are formed.

In an aspect of the invention, the optical article is characterized in that the marking portion has a surface shape including at least one of a letter, a number, a geometric configuration, a geometric pattern, and an identification symbol.

Further, according to the invention, there is provided a method for manufacturing a mold which includes a plurality of convex portions having a pitch equal to or less than a wavelength of visible light and a plurality of concave portions formed between the adjacent convex portions on the surface of the mold, the method including: a concavo-convex forming step of forming the convex portion and the concave portion on the surface of the mold; and a marking step of bringing a part of a region where the convex portion and the concave portion are formed into contact with a fluid dissolving the mold and making a height of the convex portion be lower than a height of the convex portion formed in the concavo-convex forming step.

In an aspect of the invention, the method is characterized in that the concavo-convex forming step includes an anodization treatment of anodizing an aluminum base material to form a fine concave structure on the surface of the aluminum base material and an expansion treatment of bringing the fine concave structure into contact with an etching solution to expand an aperture of the fine concave structure.

In the aspect of the invention, the method is characterized in that the fluid used in the marking step and the etching solution used in the expansion step have the same composition.

In the aspect of the invention, the method is characterized in that the fluid used in the marking step and the etching solution contain phosphoric acid.

In the aspect of the invention, the method is characterized in that a viscosity of the fluid used in the marking step at 20° C. is 0.5 to 5000 cP.

In the aspect of the invention, the method is characterized in that a viscosity of the fluid used in the marking step at 20° C. is 1 to 1500 cP.

In the aspect of the invention, the method is characterized in that the marking step is to bring a member attached with the fluid into contact with the mold.

Further, in an aspect of the invention, there is provided an apparatus for manufacturing a film having a fine concavo-convex structure on the surface of the film, wherein the fine concavo-convex structure of the surface of the roll-shaped mold having a fine concavo-convex structure on the surface of the mold, which is manufactured by the method for manufacturing a mold which includes a plurality of convex portions having a pitch equal to or less than a wavelength of visible light and a plurality of concave portions formed between the adjacent convex portions on the surface of the mold, the method including a concavo-convex forming step of forming the convex portion and the concave portion on the surface of the mold, and a marking step of bringing a part of a region where the convex portion and the concave portion are formed into contact with a fluid dissolving the mold and making a height of the convex portion be lower than a height of the convex portion formed in the concavo-convex forming step, is transferred onto the surface of a strip-shaped film main body, which moves along a part of the surface of the roll-shaped mold in synchronization with the rotation of the roll-shaped mold, to obtain a film having a fine concavo-convex structure on the surface of the film, and the film is rewound by a winding roll.

Effect of the Invention

According to the invention, it is possible to easily mark the mold, and a dent is not generated even when the molded body is rewound in a roll shape. In addition, it is possible to relatively figure out a defect position derived from the mold from the marking position on the molded body.

The defect derived from the mold includes a defect which cannot be defected by the inspection after shaping as well as a small defect. However, according to the invention, it is possible to figure out a relative defect position from the marking position when a defect of the mold itself before shaping is inspected. Moreover, this leads to improve the yield when the molded body is cut according to a product specification.

MODE(S) FOR CARRYING OUT THE INVENTION

Figure 1:
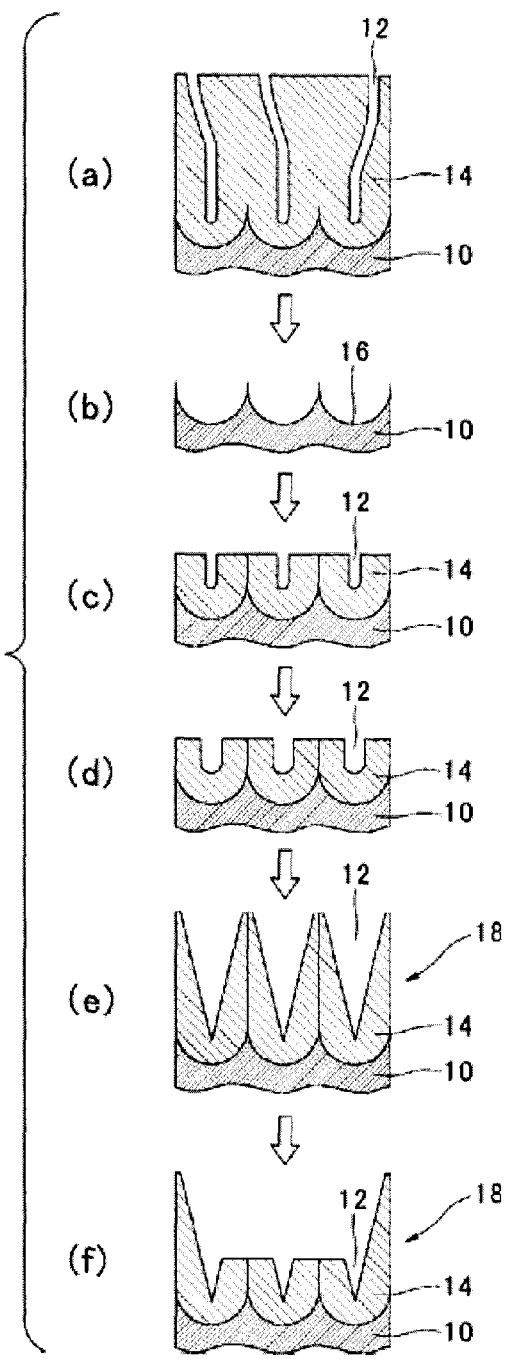
FIG. 1 is a cross-sectional view schematically illustrating a method for manufacturing a mold.

In this specification, a "pore" refers to a concave portion in a fine concavo-convex structure formed on an oxide film on a surface of an aluminum substrate.

In addition, an "interval between pores" means a center-to-center distance between adjacent pores.

Further, a "protrusion" refers to a convex portion in a fine concavo-convex structure formed on a surface of a molded body.

Further, the "fine concavo-convex structure" means a structure in which an average interval between adjacent convex portions and adjacent concave portions is 10 to 400 nm.

Further, a "height of the convex portion" means a height of the top part of the convex portion based on a plane formed by connecting the deepest portions of the concave portions in the fine concavo-convex structure formed on the surface of the mold or molded body. For example, in FIG. 3, h1 and h2 represent the height of the convex portion.

Further, a "height of the concave portion" means a height of the bottom part of the concave portion based on a plane formed by connecting the deepest portions of the concave portions in the fine concavo-convex structure formed on the surface of the mold or molded body. For example, in FIG. 3, h0, h0', and h3 represent the height of the concave portion.

Further, "(meth)acrylate" generically means acrylate and methacrylate.

Further, an "active energy ray" means a visible ray, an ultraviolet ray, an electron beam, plasma, a heat ray (such as an infrared ray), or the like.

<Method for Manufacturing Mold>

The method of forming a fine concavo-convex structure on a mold is not particularly limited, and specific examples thereof include an electron beam lithography method and a laser interference method. For example, a suitable photoresist film is applied on a suitable supporting substrate and developed by exposing to light such as ultraviolet laser, electron rays and X rays to obtain a die having a fine concavo-convex structure formed thereon, and this die can be used as it is as a mother mold. It is also possible that a supporting substrate is selectively etched by dry etching via a photoresist layer, and the resist layer is removed to form a fine concavo-convex structure directly on the supporting substrate itself.

Further, it is also possible to utilize anodized porous alumina as a mold. For example, as the anodized porous alumina, aluminum is anodized at a predetermined voltage using oxalic acid, sulfuric acid, phosphoric acid, or the like as an electrolyte to form a fine concavo-convex structure, and this structure may be used as a mold. Hereinafter, a specific example of a case where the anodized porous alumina is used as a mold will be described.

According to an embodiment of the invention, the method for manufacturing a mold includes the following steps (a) to (f):

(a) a step of applying a voltage to an aluminum substrate subjected to a machining process and anodizing the surface of the aluminum substrate to form an oxide film;

(b) a step of removing at least a part of the oxide film formed in the above step (a);

(c) a step of anodizing the aluminum substrate after the above step (b) or the following step (d) to form an oxide film having a plurality of pores;

(d) a step of expanding a pore diameter of the pores after the above step (c);

(e) a step of repeatedly and alternately performing the above step (c) and the above step (d); and (f) a step of dissolving a part of the oxide film to form a marking portion on a mold.

(Step (a))

The step (a) is a first oxide film forming step of applying a voltage to an aluminum substrate subjected to a machining process and anodizing the surface of the aluminum substrate to form an oxide film.

When the step (a) is performed, for example, as illustrated in FIG. 1, an oxide film 14 having a plurality of pores 12 is formed on the surface of an aluminum substrate 10.

A part or the whole of the surface of the aluminum substrate is immersed in an electrolyte to be anodized and thus an oxide film can be formed at a portion which has been immersed in the electrolyte. In the oxide film formed at the initial stage of anodization, positions or sizes of the pores are not uniform and the regularity of the pores is not present at all. However, as the thickness of the oxide film increases, the regularity of pore arrangement gradually increases.

The shape of the aluminum substrate is not particularly limited, and any shape such as a plate shape, a columnar shape, or a cylindrical shape may be used as long as it can be used as a mold.

As the aluminum substrate, one which is subjected to a machining process is used.

The term "machining process" in the invention means that the surface of the aluminum substrate is physically ground or polished to be mirror-finished without performing electrolytic polishing. Incidentally, physical polishing also includes "tape polishing."

The purity of the aluminum substrate is preferably 97% by mass or more, more preferably 99.0% by mass or more, still more preferably 99.5% by mass or more, and most preferably 99.9% by mass or more. If the purity of aluminum is low, when the aluminum substrate is anodized, a concavo-convex structure having a size that allows visible light to be scattered due to segregation of impurities may be formed, or the regularity of the pores obtained by anodization may decrease, in some cases.

However, in the case of using aluminum with a high purity, when the aluminum substrate is processed in a desired shape (for example, a cylindrical shape), the aluminum substrate is too soft to be processed in some cases. In this regard, one obtained by adding magnesium to aluminum and being processed in a predetermined shape may be used as the aluminum substrate. When magnesium is added, the strength of aluminum is increased and thus the substrate is easily processed. However, as the added amount of magnesium increases, a haze of the molded body in which the fine concavo-convex structure of the mold to be obtained is transferred onto the surface of the molded main body tends to increase. Therefore, it is preferable to decide the added amount of magnesium while taking into account the strength of aluminum and the haze of the molded body, and the added amount of magnesium is usually about 0.1 to 3% by mass with respect to aluminum.

Examples of the electrolyte include an acid aqueous solution or an alkaline aqueous solution, and an acid aqueous solution is preferable. Examples of the acid aqueous solution include inorganic acids (for example, sulfuric acid or phosphoric acid), and organic acids (for example, oxalic acid, malonic acid, tartaric acid, succinic acid, malic acid, or citric acid). Sulfuric acid, oxalic acid, and phosphoric acid are particularly preferable. One kind of these acids may be used alone, or two or more kinds thereof may be used in combination.

In a case where the oxalic acid is used as the electrolyte:

The concentration of the oxalic acid is preferably 0.7 M or less. When the concentration of the oxalic acid exceeds 0.7 M, in some cases, the current value may become excessively high and thus the surface of the oxide film may become rough.

The temperature of the electrolyte is preferably 60° C. or lower, and more preferably 45° C. or lower. When the temperature of the electrolyte exceeds 60° C., a phenomenon, so-called "burning," occurs so that the pores are damaged or the regularity of the pores is broken due to melting of the surface.

In a case where the sulfuric acid is used as the electrolyte:

The concentration of the sulfuric acid is preferably 0.7 M or less. When the concentration of the sulfuric acid exceeds 0.7 M, in some cases, the current value may become excessively high and thus the constant voltage cannot be maintained.

The temperature of the electrolyte is preferably 30° C. or lower, and more preferably 20° C. or lower. When the temperature of the electrolyte exceeds 30° C., a phenomenon, so-called "burning," occurs so that the pores are damaged or the regularity of the pores is broken due to melting of the surface.

Step (b):

As illustrated in FIG. 1, at least a part of the oxide film 14 is removed once to form pore originating points 16 of anodization. According to this, the regularity of the pores can be improved.

Examples of a method of removing the oxide film include a method of removing the oxide film by dissolving it in a solution that does not dissolve aluminum but selectively dissolves the oxide film. Examples of such a solution include a mixture of chromic acid/phosphoric acid and the like. Incidentally, as illustrated in FIG. 1, when the whole oxide film 14 is removed, it is possible to obtain pores arranged with higher regularity. However, in a case where high regularity is not necessary, there is no need for removing the whole oxide film 14.

Step (c):

As illustrated in FIG. 1, when the aluminum substrate 10 in which at least a part of the oxide film has been removed is anodized again, the oxide film 14 having cylindrical pores 12 is formed.

When the anodization is performed under the same condition as in the step (a), pores with high regularity can be obtained. However, the condition of anodization may be changed variously. The longer the time for anodization is extended, the deeper the pores can be obtained.

Step (d):

As illustrated in FIG. 1, a treatment of expanding a diameter of the pores 12 (hereinafter, referred to as the pore diameter expanding treatment) is performed. The pore diameter expanding treatment is a treatment of expanding the diameter of the pores obtained by anodization by immersion in a solution (etching solution) that dissolves the oxide film. Examples of such a solution include an approximately 5% by mass aqueous solution of phosphoric acid.

The longer the time of the pore diameter expanding treatment is extended, the larger the pore diameter becomes.

Step (e):

As illustrated in FIG. 1, when the anodization in the step (c) and the pore diameter expanding treatment in the step (d) are repeatedly performed, the oxide film 14 having pores in a shape in which the diameter continuously decreases from an opening toward a depth direction is formed, and a mold 18 having anodized alumina (a porous oxide film of aluminum (alumite)) on the surface of the aluminum substrate 10 is obtained. It is preferable that the final step be the step (d).

The number of times of repetition of the step (c) and the step (d) is preferably three or more, and more preferably five or more in total. When the number of times of repetition is two or less, since the diameter of the pores decreases discontinuously, a moth-eye structure formed by using the anodized alumina having such pores has an insufficient effect of reducing reflectance.

Examples of a shape of the pore 12 include a substantially conical shape, a pyramid shape, and a columnar shape, and is preferably a shape in which a sectional area of the pore in a direction orthogonal to the depth direction decreases continuously from the outermost surface toward the depth direction, such as a cone shape or a pyramid shape.

An average interval between the pores 12 is obtained in such a manner that 50 intervals between the adjacent pores 12 (a distance from the center of the pore 12 to the center of the adjacent pore 12) are measured by electron microscope observation to average these measured values.

The average interval between the pores 12 is equal to or less than the wavelength of visible light, that is, 400 nm or less. The average interval between the pores 12 is preferably 20 nm or more.

A depth of the pores 12 is obtained by measuring the distance between the top part of the convex portion existing between the pores 12 and the bottom part of the pores 12 when observed at a magnification of 30000 by electron microscope observation.

An aspect ratio of the pores 12 (the depth of the pores/the average interval between the pores) is preferably 0.8 to 5.0, more preferably 1.2 to 4.0, and particularly preferably 1.5 to 3.0.

Specifically, for example, in a case where the average interval between the pores is 100 nm, the depth of the pores 12 is preferably 80 to 500 nm, more preferably 120 to 400 nm, and particularly preferably 150 to 300 nm.

Step (f):

Subsequently, as illustrated in FIG. 1, a marking portion is formed in the region (transfer portion) where the fine concavo-convex structure is formed. The marking portion is formed in such a manner that a part of an oxide film is dissolved by bringing a marking solution capable of dissolving an anode oxide film into contact with the anode oxide film for a predetermined time so as to change a height of a part of the convex portion in the fine concavo-convex structure and then the marking solution is removed by washing or the like.

Figure 4:
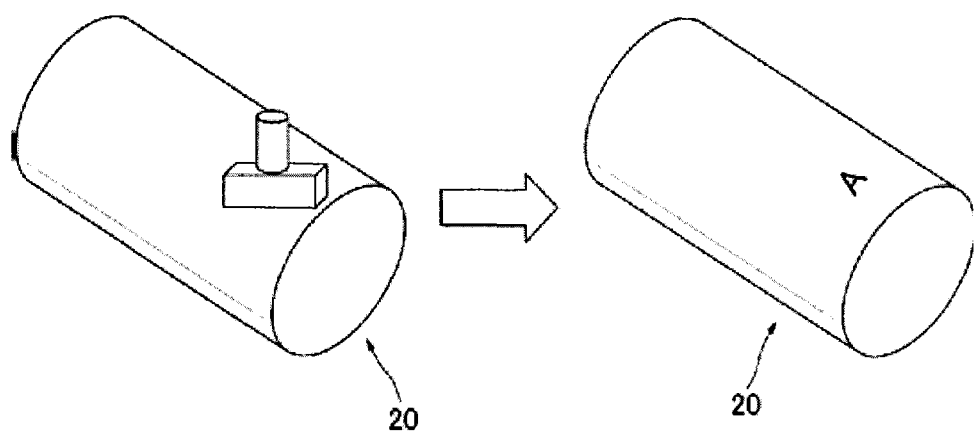
FIG. 4 is a schematic diagram illustrating a contact method of a marking solution.

As a method of bringing the marking solution into contact with the anode oxide film, a method in which the marking solution is applied to a rubber stamp or a soft plastic stamp as illustrated in FIG. 4 and then the stamp is pressed to the transfer portion, a method of directly applying the marking solution to a part of the transfer portion, or the like is exemplified. The time for bringing the marking solution into contact with the anode oxide film is preferably 1 minute or longer, more preferably 5 minutes or longer, and more preferably 20 minutes or longer. The upper limit of the contact time is not particularly limited (because there is no change in that visual observation can be performed even when the contact time is 20 minutes or longer), the time is preferably 180 minutes or shorter from the viewpoint of efficiently manufacturing a mold.

Further, the viscosity of the marking solution at 20° C. is preferably 0.5 cP or more but 5000 cP or less. When the viscosity of the marking solution is set to 0.5 cP or more, it is possible to suppress that the marking fluid flows or is dripped from a desired region on the anode oxide film. In addition, when the viscosity thereof is set to 5000 cP or less, it is possible to suppress that the marking solution becomes stringy and thus the marking solution is attached to an unintended region. The viscosity of the marking solution at 20° C. is more preferably 1 cP or more but 1500 cP or less.

As the marking solution, any one that can dissolve the anode oxide film without applying electricity or high temperature and change the height of the convex portion may be used, and either of acid or alkali may be used. In addition to phosphoric acid used in edging of the anodization, an aqueous solution of acid such as oxalic acid, hydrochloric acid, diluted nitric acid, diluted sulfuric acid, acetic acid, or citric acid, or an alkaline aqueous solution such as sodium hydroxide or potassium hydroxide may be also used. Specifically, phosphoric acid, a mixed solution of chromic acid.phosphoric acid, a mixed solution of phosphoric acid.oxalic acid, or the like can be used, and it is more preferable to use phosphoric acid from the viewpoint of effectively dissolving the oxide film. Further, in a case where phosphoric acid is used in the step (d), when the same kind of acid or alkali is used, it is preferable to use phosphoric acid as the marking solution from the viewpoint of the fact that materials necessary for manufacturing a mold can be reduced.

The concentration of phosphoric acid used in the marking solution is preferably 10% or more but 85% or less. When the concentration of the solution of phosphoric acid is high, the viscosity is high. The viscosity of the solution of 85% of phosphoric acid at 20° C. varies depending on a solvent, but is usually 45 cp to 60 cP. However, for example, when the concentration of the solution of phosphoric acid is decreased to 25.5%, the viscosity is decreased to 1.5 to 3 cP. When the concentration of the solution of phosphoric acid is less than 10%, the viscosity of phosphoric acid is decreased. Therefore, phosphoric acid applied to the surface of the mold is dripped or the like, and thus it may be difficult to form the marking portion in a desired shape in some cases. When the concentration of phosphoric acid is more than 85%, the oxide film is dissolved too much. Accordingly, there is a concern that the film is dissolved until the concave portion (valley portion) in the concavo-convex structure is deepened. Further, it may be difficult to form the marking portion in a desired shape in some cases. Incidentally, in a case where the viscosity of the marking solution is low, for example, in a case where the concentration of the solution of phosphoric acid is less than 10%, the viscosity of the marking solution is adjusted, for example, by adding a thickener, and preferably, the viscosity at 20° C. may be adjusted to be 0.5 cP or more.

Figure 3:
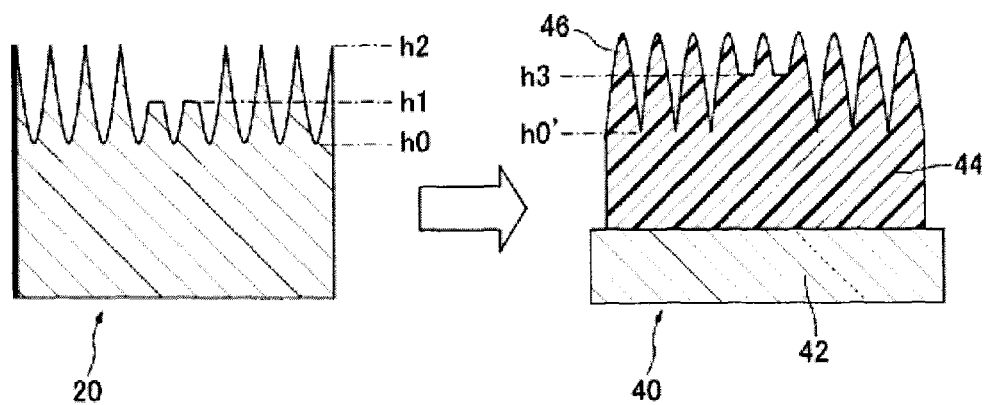
FIG. 3 is a cross-sectional view schematically illustrating a mold having a marking portion and a molded body manufactured by this mold.

An exemplary cross-section of a marking portion formed on the surface of the mold is illustrated in the left side of FIG. 3 and an exemplary cross-section of a molded body formed by the mold having this marking portion is illustrated in the right side of FIG. 3. A difference between the height of the convex portion in the fine concavo-convex structure of the marking portion formed on the surface of the mold and the height of the convex portion in the fine concavo-convex structure of the region (transfer region) where the other fine concavo-convex structure is formed on the surface of the mold, that is, a difference between h2 and h1 is preferably 10 nm or more, more preferably 20 nm or more, and still more preferably 40 nm or more. When the difference between the heights of the convex portions is set to 10 nm or more, it is possible to more easily identify the marking portion. In FIG. 3, although the height of each convex portion in the marking portion is illustrated to be the same, it is sufficient that, when the marking process is carried out actually, the difference between the heights of the convex portions in the marking portion is lower than the height of the convex portion in the fine concavo-convex structure of the other regions.

The shape of the marking portion may be a surface shape including at least one of a letter, a geometric configuration, a geometric pattern, and an identification symbol, and any shape may be used as long as it can be identified. In an example of FIG. 4, the shape of the marking portion is a shape of an alphabet "A."

(Operation Effect)

Regarding the method for manufacturing a mold of the invention which has been described hereinbefore, since the convex portion and the concave portion are transferred onto the surface of the molded body in the step (f), a transfer region provided with the concave portion or the convex portion having a shape of a complementary dimension is formed. A marking portion is provided in this transfer region, and the marking portion is formed such that the height of the concave portion is substantially the same as the height of the concave portion in the other portion of the transfer region but the height of the convex portion is lower than the height of the convex portion in the other portion of the transfer region. When this mold is used, it is possible to easily manufacture a molded body in which the height of each convex portion in the concavo-convex structure of the molded body onto which the fine concavo-convex structure of the mold is transferred is substantially the same all over the surface of the molded body, but the height of the concave portion in the concavo-convex structure of the marking portion is higher than the height of the concave portion in the region where the other concave portions are formed. Since the top parts in the concavo-convex structure have substantially the same height all over the surface of the molded body, the generation of a defect such as a dent is suppressed even when the molded body is rewound in a roll shape. In addition, since the height of the concave portion in the marking portion of the molded body is higher than the height of the concave portion in the region where the other concave portions are formed and reflectance or transparency of light in the marking portion is different from that in the other regions, it is possible to easily identify the marking portion.

<Method for Manufacturing Molded Body>

The method for manufacturing a molded body having a fine concavo-convex structure on its surface of the invention is a method of transferring a fine concavo-convex structure made of a plurality of pores, which is formed on the surface of the mold obtained by the method for manufacturing a mold of the invention, onto the surface of a molded main body.

As illustrated in FIG. 3, onto the surface of the molded body manufactured by transferring the fine concavo-convex structure (pores) of the mold, an inversion structure (protrusions) of the fine concavo-convex structure of the mold is transferred in a relation between a key and a keyhole.

Preferred examples of a method of transferring the fine concavo-convex structure of the mold onto the surface of the molded main body include the following method: filling an uncured active energy ray-curable resin composition between the mold and a transparent substrate (molded main body), and in a state in which the active energy ray-curable resin composition is in contact with the fine concavo-convex structure of the mold, irradiating an active energy ray to cure the active energy ray-curable resin composition, and then releasing the mold. Accordingly, it is possible to manufacture a molded body having the fine concavo-convex structure that contains a cured article of the active energy ray-curable resin composition formed on the surface of the transparent substrate. The fine concavo-convex structure of the obtained molded body becomes the inversion structure of the fine concavo-convex structure of the mold.

(Molded Main Body)

As the transparent substrate, one that does not remarkably obstruct the irradiation of an active energy ray is preferable since the irradiation of the active energy ray is performed through the transparent substrate. Examples of a material of the transparent substrate include polyester resin (for example, polyethylene terephthalate or polybutylene terephthalate), polymethacrylate resin, polycarbonate resin, vinyl chloride resin, acrylonitrile butadiene styrene (ABS) resin, styrene resin, and glass.

(Active Energy Ray-Curable Resin Composition)

As compared with a method of using a thermosetting resin composition, a method of using the active energy ray-curable resin composition does not require heating or cooling after the curing, and thus is capable of transferring the fine concavo-convex structure in a short time, which is favorable for mass production.

Examples of a method of filling the active energy ray-curable resin composition include a method of rolling to fill the active energy ray-curable resin composition after supplying it between the mold and the transparent substrate, a method of laminating the transparent substrate on the mold coated with the active energy ray-curable resin composition, and a method of coating the transparent substrate with the active energy ray-curable resin composition in advance and then laminating the coated transparent substrate on the mold.

The active energy ray-curable resin composition contains a polymerization reactive compound and an active energy ray polymerization initiator. In addition to the above, the active energy ray-curable resin composition may also contain a non-reactive polymer or an active energy ray sol-gel reactive composition, and may also contain various additives such as a thickener, a leveling agent, an ultraviolet absorber, a light stabilizer, a heat stabilizer, a solvent, and an inorganic filler, depending on uses.

Examples of the polymerization reactive compound include a monomer, an oligomer, and a reactive polymer having a radically polymerizable bond and/or a cationically polymerizable bond in a molecule.

Examples of the monomer having a radically polymerizable bond include a monofunctional monomer and a polyfunctional monomer.

Examples of the monofunctional monomer having a radically polymerizable bond include a (meth)acrylate derivative (for example, methyl(meth)acrylate, ethyl(meth)acrylate, propyl(meth)acrylate, n-butyl(meth)acrylate, i-butyl (meth)acrylate, s-butyl(meth)acrylate, t-butyl(meth) acrylate, 2-ethylhexyl(meth)acrylate, lauryl(meth)acrylate, alkyl(meth)acrylate, tridecyl(meth)acrylate, stearyl(meth) acrylate, cyclohexyl(meth)acrylate, benzyl(meth)acrylate, phenoxyethyl(meth)acrylate, isobornyl(meth)acrylate, glycidyl(meth)acrylate, tetrahydrofurfuryl(meth)acrylate, allyl (meth)acrylate, 2-hydroxyethyl(meth)acrylate, hydroxypropyl(meth)acrylate, 2-methoxyethyl(meth)acrylate, or 2-ethoxyethyl(meth)acrylate), (meth)acrylic acid, (meth) acrylonitrile, a styrene derivative (for example, styrene or α-methyl styrene), and a (meth)acrylamide derivative ((meth)acrylamide, N-dimethyl(meth)acrylamide, N-diethyl (meth)acrylamide, or dimethylaminopropyl(meth)acrylamide). One kind of these monomers may be used alone, or two or more kinds thereof may be used in combination.

Examples of the polyfunctional monomer having a radically polymerizable bond include a bifunctional monomer (for example, ethylene glycol di(meth)acrylate, tripropylene glycol di(meth)acrylate, isocyanuric acid ethylene oxide-modified di(meth)acrylate, triethylene glycol di(meth)acrylate, diethylene glycol di(meth)acrylate, neopentylglycol di(meth)acrylate, 1,6-hexanediol di(meth)acrylate, 1,5-pentanediol di(meth)acrylate, 1,3-butylene glycol di(meth)acrylate, polybutylene glycol di(meth)acrylate, 2,2-bis(4-(meth) acryloxypolyethoxyphenyl)propane, 2,2-bis(4-(meth) acryloxyethoxyphenyl)propane, 2,2-bis(4-(3-(meth) acryloxy-2-hydroxypropoxy)phenyl)propane, 1,2-bis(3-(meth)acryloxy-2-hydroxypropoxy)ethane, 1,4-bis(3-(meth) acryloxy-2-hydroxypropoxy)butane, dimethylol tricyclodecane di(meth)acrylate, ethylene oxide-added bisphenol A di(meth)acrylate, propylene oxide-added bisphenol A di(meth)acrylate, hydroxypivalic acid neopentylglycol di(meth)acrylate, divinylbenzene, or methylene bisacrylamide), a trifunctional monomer (for example, pentaerythritol tri(meth)acrylate, trimethylolpropane tri(meth)acrylate, trimethylolpropane ethylene oxide-modified tri(meth)acrylate, trimethylolpropane propylene oxide-modified triacrylate, trimethylolpropane ethylene oxide-modified triacrylate, or isocyanuric acid ethylene oxide-modified tri(meth)acrylate), a tetra- or higher functional monomer (for example, a condensation reaction mixture of succinic acid/trimethylolethane/acrylic acid, dipentaerythritol hexa(meth)acrylate, dipentaerythritol penta(meth)acrylate, ditrimethylol propane tetraacrylate, or tetramethylol methane tetra(meth)acrylate), bi- or higher functional urethaneacrylate, bi- or higher functional polyester acrylate. One kind of these monomers may be used alone, or two or more kinds thereof may be used in combination.

Examples of the monomer having a cationically polymerizable bond include a monomer having an epoxy group, an oxetanyl group, an oxazolyl group, or a vinyloxy group, and a monomer having an epoxy group is particularly preferable.

Examples of the oligomer or reactive polymer having a radically polymerizable bond and/or a cationically polymerizable bond in a molecule include unsaturated polyesters such as a condensate of an unsaturated dicarboxylic acid and a polyalcohol, polyester (meth)acrylate, polyether (meth) acrylate, polyol(meth)acrylate, epoxy(meth)acrylate, urethane(meth)acrylate, a cationic polymerizable epoxy compound, homo- or copolymers of the aforementioned monomers having a radically polymerizable bond in a side chain.

A conventional polymerization initiator can be used as the active energy ray polymerization initiator. It is preferable to appropriately select the polymerization initiator according to the type of the active energy ray used in curing the active energy ray-curable resin composition.

In the case of utilizing photocuring reaction, examples of the polymerization initiator include a carbonyl compound (for example, benzoin, benzoin methyl ether, benzoin ethyl ether, benzoin isopropyl ether, benzoin isobutyl ether, benzyl, benzophenone, p-methoxybenzophenone, 2,2-diethoxyacetophenone, $\alpha,\alpha$-dimethoxy-$\alpha$-phenyl acetophenone, methylphenyl glyoxylate, ethylphenyl glyoxylate, 4,4'-bis(dimethylamino)benzophenone, or 2-hydroxy-2-methyl-1-phenylpropane-1-one), a sulfur compound (for example, tetramethylthiuram monosulfide or tetramethylthiuram disulfide), 2,4,6-trimethylbenzoyl diphenyl phosphine oxide, bis(2,4,6-trimethylbenzoyl)-phenyl phosphine oxide, and benzoyl diethoxy phosphine oxide. One kind of these monomers may be used alone, or two or more kinds thereof may be used in combination.

In the case of utilizing electron beam curing reaction, examples of the polymerization initiator include benzophenone, 4,4-bis(diethylamino)benzophenone, 2,4,6-trimethylbenzophenone, methyl orthobenzoyl benzoate, 4-phenylbenzophenone, t-butylanthraquinone, 2-ethylanthraquinone, thioxanthone (for example, 2,4-diethylthioxanthone, isopropylthioxanthone or 2,4-dichlorothioxanthone), acetophenone (for example, diethoxyacetophenone, 2-hydroxy-2-methyl-1-phenylpropane-1-one, benzyldimethylketal, 1-hydroxycyclohexyl-phenylketone, 2-methyl-2-morpholino(4-thiomethylphenyl)propan-1-one, or 2-benzyl-2-dimethylamino-1-(4-morpholinophenyl)-butanone), benzoin ether (for example, benzoin methyl ether, benzoin ethyl ether, benzoin isopropyl ether, or benzoin isobutyl ether), acylphosphine oxide (for example, 2,4,6-trimethylbenzoyl diphenyl phosphine oxide, bis(2,6-dimethoxybenzoyl)-2,4,4-trimethylpentyl phosphine oxide, 2,4,6-trimethylbenzoyl diphenyl phosphine oxide, or bis(2,4,6-trimethylbenzoyl)-phenyl phosphine oxide), methylbenzoyl formate, 1,7-bisacrydinylheptane, and 9-phenylacrydine. One kind of these monomers may be used alone, or two or more kinds thereof may be used in combination.

The content of the active energy ray polymerization initiator in the active energy ray-curable resin composition is preferably 0.1 to 10 parts by mass relative to 100 parts by mass of the polymerizable compound. When the content of the active energy ray polymerization initiator is less than 0.1 part by mass, it is difficult to perform the polymerization. On the other hand, when the content of the active energy ray polymerization initiator exceeds 10 parts by mass, the cured resin may be colored or the mechanical strength may be decreased in some cases.

Examples of the non-reactive polymer include acrylic resin, styrene-based resin, polyurethane resin, cellulosic resin, polyvinyl butyral resin, polyester resin, and thermoplastic elastomer.

Examples of the active energy ray sol-gel reactive composition include an alkoxysilane compound and an alkylsilicate compound.

Examples of the alkoxysilane compound include a compound represented by RxSi(OR')y. R and R' represent alkyl groups having 1 to 10 carbon atoms, and x and y are integers satisfying a relation of x+y=4. Specific examples thereof include tetramethoxysilane, tetra-iso-propoxysilane, tetra-n-propoxysilane, tetra-n-butoxysilane, tetra-sec-butoxysilane, tetra-tert-butoxysilane, methyltriethoxysilane, methyltripropoxysilane, methyltributoxysilane, dimethyldimethoxysilane, dimethyldiethoxysilane, trimethylethoxysilane, trimethylmethoxysilane, trimethylpropoxysilane, and trimethylbutoxysilane.

Examples of the alkylsilicate compound include a compound represented by R1O[Si(OR3)(OR4)O]zR2. R1 to R4 respectively represent alkyl groups having 1 to 5 carbon atoms, and z represents an integer of 3 to 20. Specific examples thereof include methyl silicate, ethyl silicate, isopropyl silicate, n-propyl silicate, n-butyl silicate, n-pentyl silicate, and acetyl silicate.

(Manufacturing Apparatus)

Figure 2:
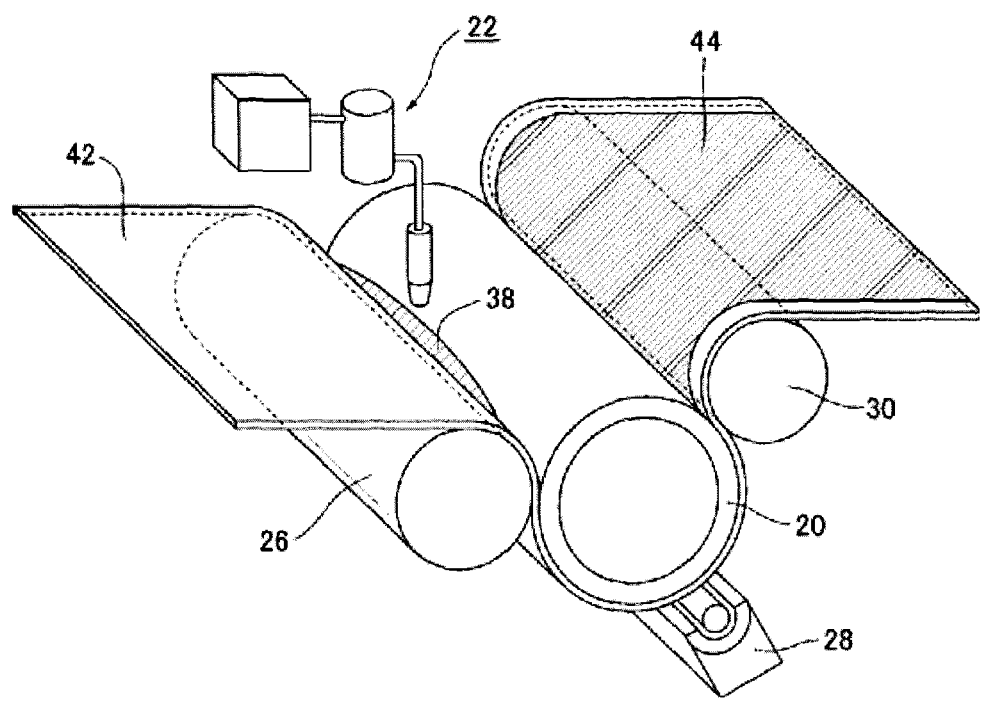
FIG. 2 is a schematic diagram illustrating an apparatus for manufacturing a molded body.

The molded body having a fine concavo-convex structure on the surface thereof is manufactured by, for example, using a manufacturing apparatus illustrated in FIG. 2 in the following manner.

The active energy ray-curable resin composition 38 is supplied from the tank 22 between the roll-shaped mold 20 that has a fine concavo-convex structure (not illustrated) on its surface and of which the outer shape is a roll shape and the strip-shaped film 42 (transparent substrate) that moves along a part of the surface of the roll-shaped mold 20 in synchronization with the rotation of the roll-shaped mold 20.

The film 42 and the active energy ray-curable resin composition 38 are nipped between the roll-shaped mold 20 and a nip roll 26 with nip pressure adjusted by a pneumatic cylinder so that the active energy ray-curable resin composition 38 is filled in the concave portion in the fine concavo-convex structure of the roll-shaped mold 20 while being uniformly dispersed between the film 42 and the roll-shaped mold 20.

By irradiating the active energy ray-curable resin composition 38 with an active energy ray through the film 42 from an active energy ray-irradiation apparatus 28 disposed under the roll-shaped mold 20, the active energy ray-curable resin composition 38 is cured, thereby forming a cured resin layer 44 onto which the fine concavo-convex structure on the surface of the roll-shaped mold 20 is transferred.

By separating the film 42 having the cured resin layer 44 formed on its surface from the roll-shaped mold 20 using a separating roll 30, a molded body 40 as illustrated in FIG. 3 is obtained. The film 42 separated from the roll-shaped mold 20 is rewound by a winding roll (not illustrated), and thus the film 42 having a fine concavo-convex structure on its surface is obtained.

Examples of the active energy ray-irradiation apparatus 28 include a high-pressure mercury lamp and a metal-halide lamp. An irradiation amount of the active energy ray is satisfactory as long as it is an amount of energy sufficient for curing of the active energy ray-curable resin composition, and is usually about 100 mJ/cm$^2$ to 10000 mJ/cm$^2$.

(Molded Body)

The molded body 40 thus manufactured is obtained by forming the cured resin layer 44 on the surface of the film 42 (transparent substrate) as illustrated in FIG. 3. The cured resin layer 44 is a film containing a cured article of the active energy ray-curable resin composition, and has the fine concavo-convex structure on its surface.

The fine concavo-convex structure on the surface of the molded body 40 in a case where the mold obtained by the invention is used is formed by transferring the fine concavo-convex structure on the surface of the oxide film onto the surface of the molded body 40, and includes a plurality of protrusions 46 formed of the cured article of the active energy ray-curable resin composition.

The fine concavo-convex structure is preferably a so-called moth-eye structure formed by arranging a plurality of protrusions (convex portions) having a substantially conical shape, a pyramid shape and the like. It is known that the moth-eye structure, in which the interval between the protrusions is equal to or less than the wavelength of visible light, becomes an effective anti-reflection means through the continuous increase of its refractive index from the refractive index of air to the refractive index of a material.

In the molded body, the marking portion having a surface shape including at least one of a letter, a number, a geometric configuration, a geometric pattern, and an identification symbol is formed. The height of the top part of the protrusion 46 in this marking portion is substantially equal to that in the other region, but the height of the concave portion (valley portion) is formed to be higher than the height of the concave portion in the region where the other concave portions are formed. A difference between the height of the concave portion in the marking portion and the height of the concave portion in the region where the other concave portions are formed is preferably 10 nm or more, more preferably 20 nm or more, and still more preferably 40 nm or more.

Figure 5:
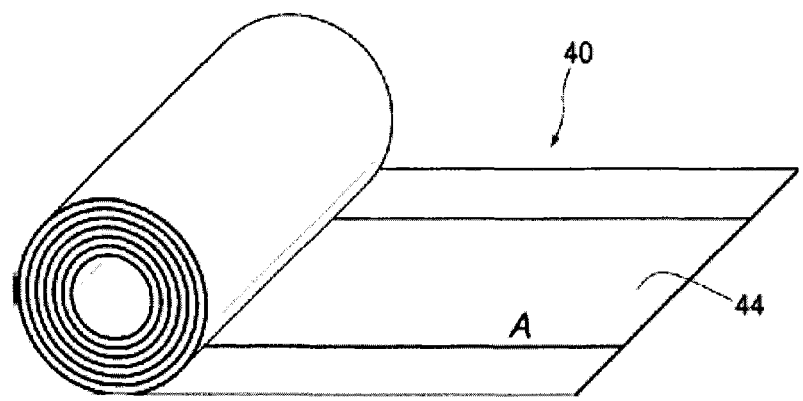
FIG. 5 is a schematic diagram illustrating a molded body manufactured by a mold having a marking portion.

Since the top parts in the concavo-convex structure of the molded body have substantially the same height, the generation of a defect such as a dent is suppressed even when the molded body is rewound in a roll shape. Further, since the height of the bottom part of the concave portion in the marking portion is higher than the height of the concave portion in the region where the other concave portions are formed and reflectance or transparency of light in the marking portion is different from that in the other regions, it is possible to easily identify the marking portion as illustrated in FIG. 5. If the marking portion is easily identified, when a defect is found by inspecting the molded body, it is possible to easily inspect whether a defect is included in a specific portion of the mold from the relative positional relation with the marking portion.

Further, even in a case where it is determined that there is a defect at a specific position on the mold, when a defect generation portion on the molded body is specified from the relative positional relation with the marking portion and the molded body is cut or punched in a desired shape while avoiding this portion, it is possible to manufacture a molded body which has been cut or punched in a predetermined shape by using the mold which is determined that there is a defect.

(Application)

The molded body having a fine concavo-convex structure on its surface, which is obtained by the invention, exhibits various functions such as anti-reflection function and water repellent function by the fine concavo-convex structure on its surface.

In a case where the molded body having a fine concavo-convex structure on its surface is sheet-shaped or film-shaped, it can be used as an anti-reflection film by, for example, being stuck to a surface of an object such as an image display apparatus (a display of a television, a mobile phone, or the like), an exhibition panel, a meter panel, and the like, or being insert-molded. In addition, it can also be used as a member of an object at risk of exposure to rain, water, vapor, and the like, such as a window or mirror in a bathroom, a solar cell member, a car mirror, a signboard, and a lens of glasses, so as to exhibit the water repellent function.

In a case where the molded body having a fine concavo-convex structure on its surface has a three-dimensional shape, a transparent substrate having a shape corresponding to its use can be used for manufacturing an anti-reflective product, which can be used as a member for constituting a surface of the above-mentioned object.

In addition, in a case where the object is an image display apparatus, the molded body having a fine concavo-convex structure on its surface may also be stuck to, not only the surface of the object, but also a front panel thereof. The front panel itself can also be constituted by the molded body having a fine concavo-convex structure on its surface. For example, the molded body having a fine concavo-convex structure on its surface may be applied to a surface of a rod lens array installed in a sensor array that reads an image, a cover glass of an image sensor of a fax, a photocopier, or a scanner, a contact glass of a photocopier for placing an original copy thereon, and the like. In addition, the molded body having a fine concavo-convex structure on its surface can also be applied to a light receiving section or the like of optical communication equipment for visible light communication and the like, so as to enhance signal reception sensitivity.

In addition, the molded body having a fine concavo-convex structure on its surface can also be capable of developing for optical uses as a light guide, a relief hologram, an optical lens, a polarization separating element and the like, or for use as a cell culture sheet.

EXAMPLES

Hereinafter, the invention will be described in more detail by means of Examples. However, the invention is not limited to these Examples.

Various methods of measurement and evaluation are as follows.

(Measurement of Pores of Mold)

A portion of the mold having an oxide film formed on a surface thereof was cut, platinum was vapor-deposited on the surface for 1 minute and was observed using a field emission scanning electron microscope (manufactured by JEOL Ltd., "JSM-6701F") under conditions of an accelerating voltage of 3.00 kV. The observation was made at a magnification of 10000. The average interval between pores (pitch) was obtained by averaging the center-to-center distances of six pores that are arranged on a straight line.

In addition, two different portions of the mold were cut, platinum was vapor-deposited on the longitudinal cross-section thereof for 1 minute and was observed similarly using a field emission scanning electron microscope under conditions of an accelerating voltage of 3.00 kV. Each cross-sectional sample was observed at a magnification of 50000, and the depths of ten pores in the observation range were measured and then averaged. This measurement was performed on two points and an average value of each observation point was further averaged to obtain an average depth of the pores.

(Measurement of Protrusions of Molded Body)

Platinum was vapor-deposited on the surface and the longitudinal cross-section of the molded body (film) for 10 minutes and the surface and the cross-section of the molded body were observed using a field emission scanning electron microscope (manufactured by JEOL Ltd., "JSM-6701F") under conditions of an accelerating voltage of 3.00 kV.

The surface of the molded body was observed at a magnification of 10000, and an average interval between protrusions (pitch) was obtained by averaging the center-to-center distances of six protrusions (convex portions) that are arranged on a straight line. In addition, the cross-section of the molded body was observed at a magnification of 50000, and an average height of protrusions was obtained by averaging the heights of ten protrusions.

(Measurement of Viscosity)

The viscosity was measured with a rheometer (AR550 manufactured by TA Instruments Inc.) using a 60 mm cone-plate, and the measurement was performed at a temperature of 20° C. and a shear rate in a range of 0.1 to 1000 (1/s). A viscosity value which did not change with respect to the shear rate was designated as a viscosity of the invention.

(Confirmation of Marking Portion)

The molded body was visually observed. A case where the marking portion could be easily identified was designated as ○, a case where the marking portion could be identified while the molded body was carefully observed was designated as Δ, and a case where the marking portion was difficult to be identified was designated as ×.

Example 1

Manufacture of Mold

An aluminum ingot having a purity of 99.97% by mass was cut into a roll shape having a diameter of 200 mm and a width of 320 mm, and the surface thereof was cut and mirror-finished so as to be used as an aluminum substrate. The materials of the substrate are presented in Table 1. Incidentally, in the table, "Al" represents aluminum, and "3N7" represents the purity of aluminum and means that the purity is 99.97% by mass.

The aluminum substrate was anodized in an aqueous solution of 0.3 M oxalic acid for 6 hours under the conditions of a DC current of 40 V and a temperature of 16° C. (the step (a)).

Subsequently, the aluminum plate having the oxide film formed thereon was immersed in a mixed aqueous solution of 6% by mass of phosphoric acid/1.8% by mass of chromic acid for 6 hours, thereby removing the oxide film (the step (b)).

Subsequently, the aluminum substrate was anodized in an aqueous solution of 0.3 M oxalic acid for 20 seconds under the conditions of a DC current of 40 V and a temperature of 16° C. (the step (c)).

Subsequently, the aluminum plate having the oxide film formed thereon was immersed in an aqueous solution of 5% by mass of phosphoric acid at 32° C. for 8 minutes to perform the pore diameter expanding treatment (the step (d)).

Subsequently, the step (c) and the step (d) were repeated to be performed four times in total, the last step being the step (d) (the step (e)), thereby forming anodized alumina having substantially conical pores with an average interval of 100 nm and a depth of 220 nm on the surface of the aluminum substrate.

Subsequently, BEMCOT was impregnated with phosphoric acid with a concentration of 85% (viscosity of 47 cP), a rubber stamp was pressed to BEMCOT, and the rubber stamp applied with phosphoric acid was pressed against the surface of the anodized alumina, thereby performing marking. After standing still for 20 minutes, phosphoric acid was removed by washing a portion subjected to the marking with water to form a marking portion (the step (f), thereby obtaining a roll-shaped mold. As the roll-shaped mold was visually checked, it was confirmed that the marking portion was formed.

The obtained mold was immersed in a dilute solution of 0.1% by mass of OPTOOL DSX (manufactured by Daikin Industries, Ltd.) and then was air-dried overnight, thereby obtaining a roll-shaped mold which was processed by a mold release agent.

(Manufacture of Molded Body)

An active energy ray-curable resin composition with the following composition was filled between the mold obtained after a releasing treatment and an acrylic film (manufactured by Mitsubishi Rayon Co., Ltd., "ACRYLPLEN HBS010") as a transparent substrate, and an ultraviolet ray with an integrated light amount of 1000 mJ/cm$^2$ was irradiated by using a high-pressure mercury lamp to cure the active energy ray-curable resin composition. Thereafter, the mold was released and a molded body (film) consisting of a transparent substrate and a cured product of a curable composition was obtained.

A fine concavo-convex structure was formed on the surface of the molded body thus manufactured, an average interval (pitch) of the protrusions was 100 nm, and an average height of the protrusions was about 220 nm. Further, the molded body was rewound in a roll shape, but a winding wrinkle or a dent was not generated.

The obtained molded body was visually observed and then checking of the marking portion was carried out. The results thereof are presented in Table 1.

Active Energy Ray-Curable Resin Composition:

dipentaerythritol hexaacrylate (manufacture by Shin-Nakamura Chemical Co., Ltd.): 25 parts by mass, pentaerythritol triacrylate (manufactured by Dai-Ichi Kogyo Seiyaku Co., Ltd.): 25 parts by mass, ethylene oxide-modified dipentaerythritol hexaacrylate (manufactured by Nippon Kayaku Co., Ltd.): 25 parts by mass, polyethylene glycol diacrylate (manufactured by TOAGOSEI CO., LTD.): 25 parts by mass, 1-hydroxycyclohexyl phenyl ketone (manufactured by BASF): 1 part by mass, bis(2,4,6-trimethylbenzoyl)-phenylphosphine oxide (manufactured by BASF): 0.5 part by mass, and polyoxyethylene alkyl (12 to 15) ether phosphate (manufactured by Nippon Chemicals Sales Co., Ltd.): 0.1 part by mass.

Examples 2 to 5

A molded body was manufactured in the same manner as in Example 1, except that the concentration of phosphoric acid with which BEMCOT was impregnated and the time for standing still after pressing the rubber stamp in the step (f) were changed as presented in Table 1. The molded body was visually observed. The results thereof are presented in Table 1.

TABLE 1

|  | Example 1 | Example 2 | Example 3 | Example 4 | Example 5 |
|---|---|---|---|---|---|
| Concentration of phosphoric acid (%) | 85 | 85 | 85 | 25.5 | 42.5 |
| Viscosity (cP) | 47 | 47 | 47 | 1.5 | 1.5 |
| Time for standing still (min) | 20 | 10 | 5 | 30 | 30 |
| Checking of marking portion | ○ | Δ | Δ | ○ | ○ |

Comparative Example 1

A molded body was manufactured in the same manner as in Example 1, except that the step (f) was not performed. Further, marking was performed in the vicinity of the end portion of the molded body with an oil-based pen, but the marking disappeared by wiping off with ethanol.

Comparative Example 2

A flaw was made as a mark on the molded body in a film conveying direction with a file. When this molded body was rewound in a roll shape, a winding wrinkle was generated.

Comparative Example 3

A molded body was manufactured in the same manner as in Example 1, except that a flaw was made on the surface of the mold with a file instead of performing the step (f). When this molded body was rewound in a roll shape, a winding wrinkle was generated.

EXPLANATIONS OF LETTERS OR NUMERALS

10 ALUMINUM SUBSTRATE
12 PORE
14 OXIDE FILM
16 PORE ORIGINATING POINT
18 MOLD
20 ROLL-SHAPED MOLD
22 TANK
26 NIP ROLL
28 ACTIVE ENERGY RAY-IRRADIATION APPARATUS
30 SEPARATING ROLL
38 ACTIVE ENERGY RAY-CURABLE RESIN COMPOSITION
40 MOLDED BODY
42 FILM
44 CURED RESIN LAYER
46 PROTRUSION

The invention claimed is:

1. A mold for manufacturing an optical article which includes a plurality of convex portions having a pitch equal to or less than a wavelength of visible light and a plurality of concave portions formed between the adjacent convex portions on the surface of the optical article, the mold comprising a transfer region provided with concave portions and convex portions having a dimension complementary to the convex portions and the concave portions of the optical article on the surface of the mold,
   wherein the transfer region is provided with a marking portion and a height of the convex portion in the marking portion is lower than a height of the convex portion of the other portion of the transfer region.

2. The mold according to claim 1, wherein the marking portion has a surface shape including at least one of a letter, a geometric configuration, a geometric pattern, and an identification symbol.

3. The mold according to claim 1, wherein the outer shape is a roll shape.

4. An optical article comprising a plurality of convex portions having a pitch equal to or less than a wavelength of visible light and a plurality of concave portions formed between the adjacent convex portions on the surface of the optical article, and a marking portion,
   wherein a height of the concave portion is higher than a height of the concave portion in a region where the other concave portions are formed.

5. The optical article according to claim 4, wherein the marking portion has a surface shape including at least one of a letter, a number, a geometric configuration, a geometric pattern, and an identification symbol.

6. A method for manufacturing a mold which includes a plurality of convex portions having a pitch equal to or less than a wavelength of visible light and a plurality of concave portions formed between the adjacent convex portions on the surface of the mold, the method comprising:
   a concavo-convex forming step of forming the convex portion and the concave portion on the surface of the mold; and
   a marking step of bringing a part of a region where the convex portion and the concave portion are formed into contact with a fluid dissolving the mold and making a height of the convex portion be lower than a height of the convex portion formed in the concavo-convex forming step.

7. The method for manufacturing a mold according to claim 6, wherein the concavo-convex forming step includes an anodization treatment of anodizing an aluminum base material to form a fine concave structure on the surface of the aluminum base material and an expansion treatment of bringing the fine concave structure into contact with an etching solution to expand an aperture of the fine concave structure.

8. The method for manufacturing a mold according to claim 7, wherein the fluid used in the marking step and the etching solution used in the expansion step have the same composition.

9. The method for manufacturing a mold according to claim 7, wherein the fluid used in the marking step and the etching solution contain phosphoric acid.

10. The method for manufacturing a mold according to claim 6, wherein a viscosity of the fluid used in the marking step at 20° C. is 0.5 to 5000 cP.

11. The method for manufacturing a mold according to claim 10, wherein a viscosity of the fluid used in the marking step at 20° C. is 1 to 1500 cP.

12. The method for manufacturing a mold according to claim 6, wherein the marking step is to bring a member attached with the fluid into contact with the mold.

13. An apparatus for manufacturing a film having a fine concavo-convex structure on the surface of the film, wherein the fine concavo-convex structure of the surface of the roll-shaped mold having a fine concavo-convex structure on the surface of the mold which is manufactured by the method according to claim 6 is transferred onto the surface of a strip-shaped film main body, which moves along a part of the surface of the roll-shaped mold in synchronization with the rotation of the roll-shaped mold, to obtain a film having a fine concavo-convex structure on the surface of the film, and the film is rewound by a winding roll.

* * * * *